Nov. 19, 1929.	E. P. HILL	1,736,443
MOTOR CONTROL SYSTEM
Filed June 27, 1925	2 Sheets-Sheet 1

WITNESSES:
J. N. Voelker
H. L. Keith

INVENTOR
Edward P. Hill.
BY
Wesley G. Carr
ATTORNEY

Patented Nov. 19, 1929

1,736,443

UNITED STATES PATENT OFFICE

EDWARD PERCY HILL, OF MANCHESTER, ENGLAND, ASSIGNOR TO WESTINGHOUSE ELECTRIC & MANUFACTURING COMPANY, A CORPORATION OF PENNSYLVANIA

MOTOR-CONTROL SYSTEM

Application filed June 27, 1925, Serial No. 39,934, and in Great Britain July 4, 1924.

My invention relates to motor control systems, more particularly to systems for starting synchronous machines.

It has previously been proposed to employ an auxiliary motor for starting a synchronous machine, such as, for example a rotary converter, the stator field windings of the motor being connected in series relation with the corresponding armature windings of the synchronous machine through the slip rings thereof during the starting operation and short-circuited after the machine has reached synchronous speed. The impedance of the motor windings is adjusted so that the initial starting current passing into the synchronous machine from an alternating current source is limited to a predetermined value.

In the case of a rotary converter, where the stator pole-windings are energized from the direct-current brushes, the residual magnetism of the stator poles is not appreciably affected owing to said limitation of the initial starting current.

It has also previously been proposed to employ a starting motor directly connected to the alternating current source and to provide means for connecting the armature windings of the machine through reactance or choke coils to limit the current initially passing into the armature windings, said reactance being short-circuited after the machine has pulled into step or synchronized.

One object of my invention is to simplify the means for automatically starting and controlling a synchronous machine.

Another object of the present invention is to increase the synchronizing power of a synchronous machine without increasing the initial current passing into the machine.

According to my invention, means are provided for increasing the mean magnetizing or wattless current in the windings of the synchronous machine during or towards the end of the starting operation, without appreciably increasing the initial power current passing into the machine.

In practicing my invention where a starting motor is employed having its windings connected in series relation with the armature windings of the synchronous machine, according to a convenient arrangement, an additional winding is provided on the starting motor, said winding being adapted to be energized by direct current in such manner as to saturate the magnetic circuit of the motor and thereby to increase the mean intensity of magnetization in the magnetic circuit of the stator of the motor. By this means, an increased magnetizing or wattless current is called for, because of the decrease in reactance resulting from the saturation of the magnetic circuit, in order that the alternating magnetic flux may conform in magnitude to the voltage across the winding of the motor. Consequently, the increased magnetizing current flowing in the stator windings of the motor also flows in the windings of the synchronous machine so that its synchronizing power is thereby increased. The coils comprising said additional winding are preferably so arranged that the resultant induced alternating voltage in the whole winding is substantially zero.

In a modified arrangement, choke coils are respectively connected in parallel relation to the stator windings of the starting motor, and these choke coils are provided with further windings which are adapted to be energized by direct current in such manner as to effect saturation of the cores and to decrease the reactance of the choke coils and thereby increase the mean intensity of magnetization or magnetizing current in the choke coils on the cores. By this means, the mean magnetizing or wattless current flowing in the winding of the synchronous machine is increased, so that its synchronizing power is thereby also increased.

Where my invention is applied to a rotary converter, the additional direct current windings are preferably energized from the direct-current brushes of the converter, so that the increase in the intensity of magnetization causing an increase in the magnetizing current is most effectively obtained when the converter is approaching its synchronous speed.

In order that my invention may be more clearly understood, it will be described with reference to the accompanying drawings in which Figs. 1 and 2 are diagrams illustrating portions of the stator of a starting motor modified by the provision of additional windings;

Figure 1:
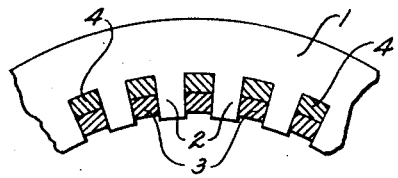

Referring to Fig. 1, the stator core 1 of the starting motor is shown together with the longitudinal core teeth 2. The conductors 3 of the normal stator winding are located in the slots between the teeth 2. The conductors 4 of the additional winding according to my invention are also located in said slots, and are wound round the core teeth in such manner that the resultant induced alternating voltage in the whole winding is substantially zero. The additional winding is arranged to be energized from a source of direct-current.

If the additional winding, comprising the conductors 4, is deenergized, so that neither a direct current nor an alternating current of a low frequency is flowing in the winding, and an alternating current voltage is applied to the normal stator winding, comprising the conductors 3, an alternating current will flow in that winding. The value of the alternating current in the conductors 3, assuming the motor is not loaded, will be directly proportional to the voltage applied and inversely proportional to the impedance of the winding for a given frequency. As the motor is not loaded, all of the current in the winding is substantially a magnetizing current, the mean intensity of which may be represented by an equivalent direct current equal in value to the root-mean-square of the alternating current. When the additional winding, comprising the conductors 4, is energized by direct current or by an alternating current of a low frequency, the stator core 1 will be saturated, or nearly so, depending upon the value of the current in the additional winding. Since the core 1 is saturated, or nearly so, the impedance of the winding, comprising the conductors 3, will decrease; therefore, the magnetizing current must increase in order that the induced voltage of the winding may remain substantially constant. As, in accordance with the invention, the alternating-current windings of the synchronous machine to be started are connected in series-circuit relation with the winding comprising the conductors 3, the magnetizing current, or mean current of magnetization, in the windings of the machine will be increased in response to the decrease in impedance of the normal stator winding disposed on the stator core 1.

Where the starting arrangement is applied to a rotary converter, the additional winding may be energized from the direct-current side of the converter and the current through it limited so as to attain a value sufficient to provide the desired increase in the magnetizing or wattless current in the converter windings, only when the converter is approaching its synchronous speed.

Figure 2:
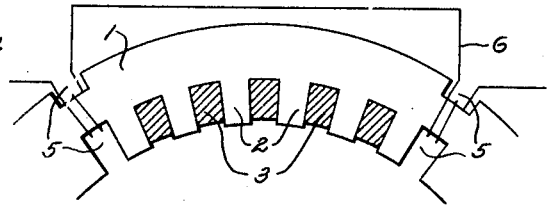

Referring to the modified arrangement shown in Fig. 2, longitudinal grooves 5 are provided in predetermined positions along both the inner and the outer walls of the stator core and a winding 6 is also provided, the conductors of which are located in said grooves. The winding 6 is arranged to be energized by direct-current, whereby the mean intensity of magnetization of the normal stator core winding may be increased to a desired value. Preferably, the winding 6 is divided into a plurality of sections, having equal numbers of turns and spaced one pole pitch apart, respectively, whereby the alternating voltages induced in the several sections substantially neutralize one another for the winding as a whole. Alternatively, a large impedance of relatively low resistance may be connected in series relation with the winding 6. Where the starting system is applied to a rotary converter, the winding 6 may be energized from the direct-current side of the converter.

Figure 3:
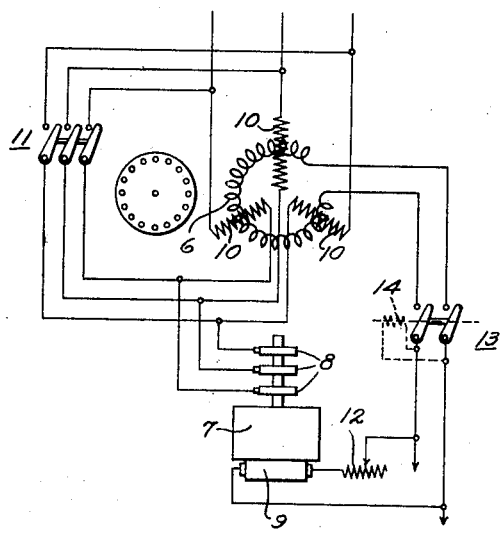
Fig. 3 is an electrical diagram of a three-phase rotary converter associated with said modified starting motor.

In Fig. 3, the application of the modified starting motor to a three-phase rotary converter is illustrated. The rotary converter 7 is provided with three slip rings 8, on the alternating-current side, and a commutator 9 on the direct-current side. The three stator windings of the starting motor 10 are connected, respectively, to corresponding slip rings of the converter 7 and are energized from a suitable source of alternating current as shown. A manually or automatically operated switch 11 is provided, which is adapted to short-circuit the windings 10 when the converter has been synchronized. The additional winding 6 on the starting motor is preferably arranged to be energized from the direct-current side of the converter, being connected through a rheostat 12 to the brushes of the commutator 9. A switch 13 may be provided in circuit with winding 6 for effecting sudden energization thereof, whereby sudden increase in the magnetizing current of the normal stator winding may be obtained to effect an accelerating impulse is given to the starting motor and thereby to the rotary converter, which facilitates the pulling into step. The switch 13 may be automatically operated by a coil 14, which is connected across the brushes of the converter 7 to effect closure of the switch 13 when the direct-current voltage of the converter reaches a predetermined value. Alternatively, the additional winding 6 may be associated with an independent source of direct current and suddenly energized therefrom either manually or automatically when the converter reaches a predetermined speed.

In operation, when the starting motor is energized the rotary converter is accelerated while the initial current passing into its windings is small, owing to the reactance of the motor windings, whereby the residual magnetism of the converter poles is unaffected, since the voltage across the direct-current brushes remains small. As the converter approaches synchronous speed and the voltage across the direct-current brushes builds up, alternating current of decreasing frequency is caused to flow in the additional windings on the starting motor, whereby increased magnetizing or wattless current is produced in the converter windings, resulting in an increased synchronizing power. As the synchronous machine pulls into step, the frequency of the current in the winding 6 is substantially zero, that is, direct current flows in the winding. When the converter has pulled into a step, the starting motor is short-circuited by switch 11.

Figure 4:
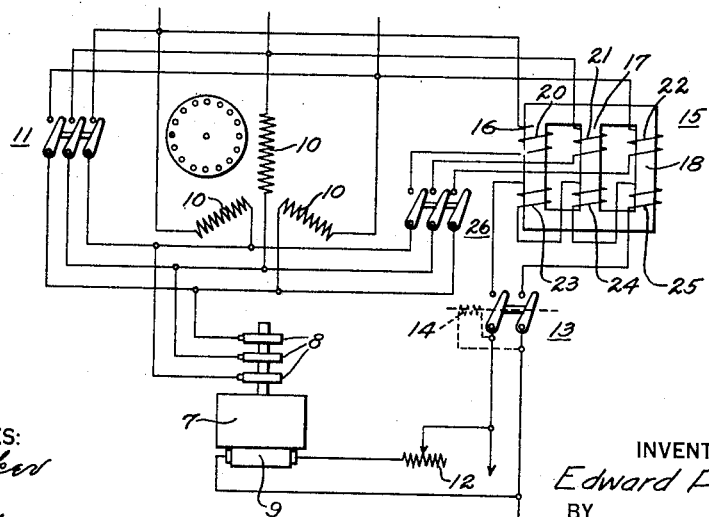
Fig. 4 is an electrical diagram of a three-phase rotary converter having a modified series connected starting motor.

In Fig. 4, a choke coil device provided with additional direct-current windings, according to my invention, is illustrated as applied to a three-phase rotary converter having a series-connected starting motor. The rotary converter 7 is provided with three slip-rings 8 on the alternating-current side and a commutator 9 on the direct-current side. The three stator windings 10 of the starting motor are connected respectively to corresponding slip rings of the converter 7. A manually or automatically operated switch 11 is provided, which is adapted to short circuit the windings 10 when the converter has been synchronized. An iron-core choke-coil device 15 is provided having three core-members 16, 17 and 18. Windings 20, 21 and 22 are provided on said core members respectively and are adapted to be connected in parallel relation to corresponding windings 10 of the starting motor during the starting operation. A switch 26 is provided in circuit with said windings and is adapted to be opened when the switch 11 is closed.

The core members 16, 17 and 18 are provided with additional windings 23, 24 and 25, respectively, which are preferably energized from the direct-current side of the rotary converter 7, being connected in series relation with an adjustable rheostat 12 and the brushes of the commutator 9. The windings 23, 24 and 25 and the rheostat 12 are so adjusted that when the rotary converter 7 is approaching synchronous speed, the current supplied to said windings magnetizes the core members 16, 17 and 18 to a predetermined value. A switch 13 may be provided in circuit with the additional windings of the choke coil device 15 for effecting sudden energization of said windings, whereby the impedance of the windings 20, 21 and 22 is suddenly decreased to effect a sudden increase of the magnetizing or wattless current through the starting motor windings 10 is obtained, which provides an accelerating impulse for the rotary converter and so facilitates the pulling into step. The switch 13 may be automatically operated by a coil 14 which is connected across the brushes of the converter 7 to effect closure of switch 13 when the voltage across the brushes reaches a predetermined value.

Figure 5:
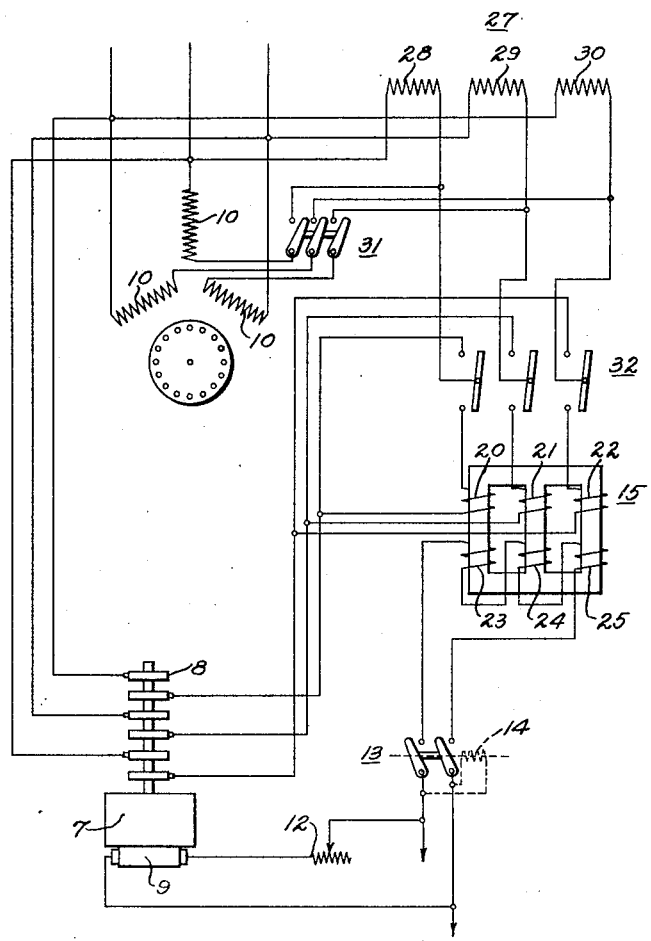
Fig. 5 is an electrical diagram of a six-phase rotary converter having a starting motor and modified starting choke coils.

Referring to Fig. 5, a choke coil device provided with additional windings is illustrated as applied to a six-phase rotary converter having a separately connected starting motor. The low tension secondary element 27 of a three-phase supply transformer comprises phase windings 28, 29 and 30. The windings 10 of the starting motor are respectively connected across corresponding phases of the secondary element 27 through a switch 31, which is adapted to effect de-energization of the motor when the converter has been synchronized. One side of each of the windings 28, 29 and 30 is connected to a corresponding slip-ring 8 of the converter 7, and the other side of the winding is connected to a switch 32, whereby it may be connected either directly or through a winding of a choke coil device 15 to a second corresponding slip-ring. As in the arrangement illustrated in Fig. 3, the coils 23, 24 and 25 that are provided on the choke coil device 15, are preferably arranged to be energized from the direct-current side of the rotary converter and are adapted to magnetize and increase the magnetic flux permeating the corresponding core members 16, 17 and 18 to a predetermined value when the rotary converter approaches synchronous speed. A switch 13 may be provided in circuit with the additional windings of the choke coil devices as described with reference to Fig. 4.

In operation the starting motor is energized and accelerates the rotary converter, three of the slip-rings of which are connected directly to the supply transformer 27. When the converter reaches a predetermined speed, the three previously disconnected slip rings are manually or automatically connected to the supply transformer through the choke coil device, 15. By the reason of the connections employed in my invention as hereinbefore described, current is caused to flow in the additional windings of the choke coil devices, when the converter approaches synchronous speed and the voltage across the direct-current brushes builds up, whereby increased magnetizing or wattless current is produced in the converter windings, resulting in an increased synchronizing power. When the converter has pulled into step, the starting motor 10 is de-energized by switch 31, the choke coil device 15 is short-circuited by switch 32 and the associated slip-rings of the converter are connected directly to the supply transformer.

It is to be understood that various modifications may be made in the systems described, without departing from the scope of my invention. For example, the additional windings producing an increased magnetizing or wattless current in the starting motor or choke coil device may be connected to the direct-current side of an exciter either directly driven by the synchronous machine or separately driven. In the case of a rotary converter, the field winding of the exciter may be energized from the direct-current side of the converter so that an effective current only flows in the additional windings when the converter is approaching synchronous speed. Or alternatively, the field winding of the exciter may be energized from a separate source of direct current.

I claim as my invention:

1. The combination with a polyphase synchronous dynamo-electric machine and starting means therefor comprising a polyphase motor, of means for connecting the respective phase windings of the machine and the motor in series relation during the starting period, a reactance device having coils for connection respectively in shunt relation to the windings of said starting motor and having additional windings for modifying the effect of said shunt-connected windings.

2. The combination with a rotary converter and starting means therefor comprising a polyphase motor, of means for connecting the respective phase windings of the converter and motor in series relation during the starting period, a reactance device having coils for connection respectively in shunt relation to the windings of said starting motor and having additional windings for modifying the effect of said shunt-connected windings, and means for connecting the windings to the direct-current side of said converter.

3. The combination with a rotary converter and starting means therefor comprising a polyphase motor, of means for connecting the respective phase windings of the converter and motor in series relation during the starting period, a reactance device having coils for connection in shunt relation to the windings of said starting motor and having additional windings for modifying the effect of said shunt-connected windings, and means for connecting the additional windings to the direct-current side of the said converter at a predetermined value of the direct-current voltage.

In testimony whereof, I have hereunto subscribed my name this eighth day of June, 1925.

EDWARD PERCY HILL.